United States Patent

[11] 3,568,968

| [72] | Inventor | Edwin C. Taylor<br>New Haven, Conn. |
|---|---|---|
| [21] | Appl. No. | 816,698 |
| [22] | Filed | Apr. 16, 1969 |
| [45] | Patented | Mar. 9, 1971 |
| [73] | Assignee | MIF Industries, Inc.<br>Branford, Conn. |

[54] UTILITY WIRE SUPPORTING BRACKET
12 Claims, 6 Drawing Figs.

[52] U.S. Cl. ................................................. 248/221
[51] Int. Cl. .................................................. F16m 13/00,
H01b 17/16
[50] Field of Search ........................................ 248/201,
221; 52/27, 40; 174/158, 158.2

[56] References Cited
UNITED STATES PATENTS

| 1,960,610 | 5/1934 | Wiegand | 174/158X |
|---|---|---|---|
| 3,360,287 | 12/1967 | Wyse | 287/53.5 |
| 3,065,945 | 11/1962 | Newsome | 248/201 |
| 3,369,788 | 2/1968 | Eisele | 248/221 |

Primary Examiner—Roy D. Frazier
Assistant Examiner—William H. Schultz
Attorney—Mattern, Ware and Davis ABSTRACT: A bracket of the type which supports power wires is formed of two elements which assemble to form a complete bracket assembly for mounting upon a pole. The elements interlock in an advantageous way, and also provide certain special features to facilitate the mounting of electrical insulators upon the bracket.

PATENTED MAR 9 1971 3,568,968
SHEET 1 OF 2
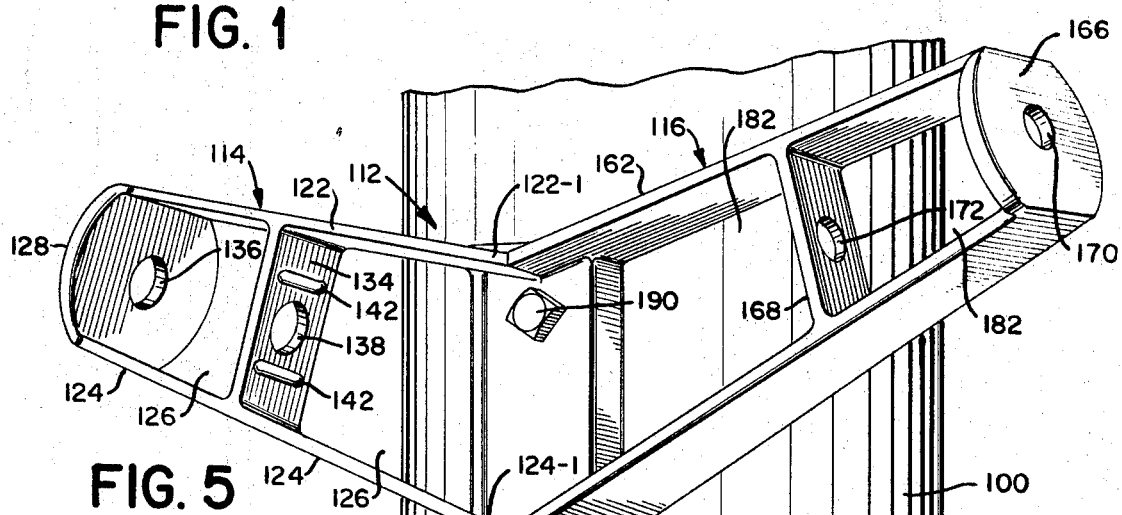
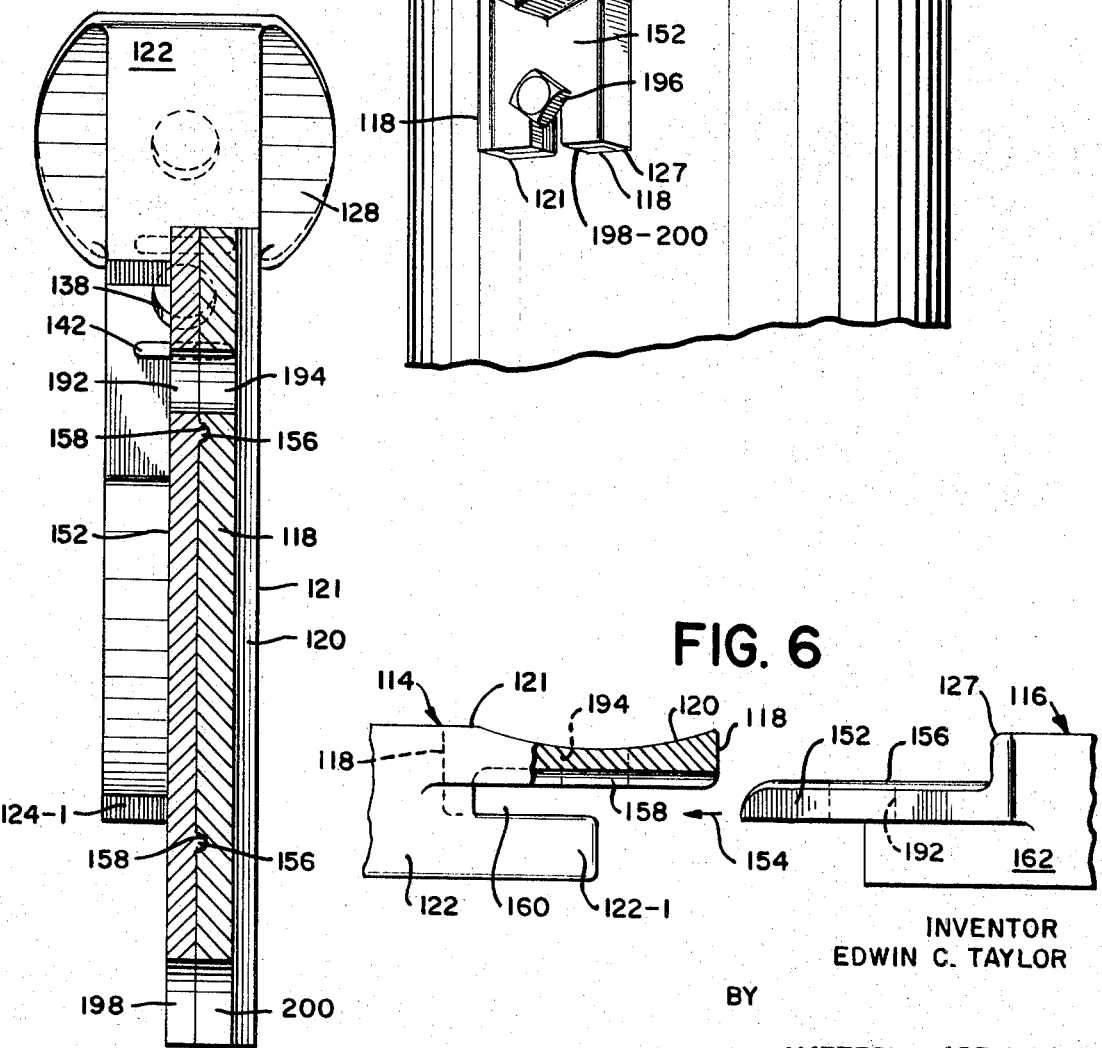
INVENTOR
EDWIN C. TAYLOR
BY
MATTERN WARE & DAVIS
ATTORNEYS

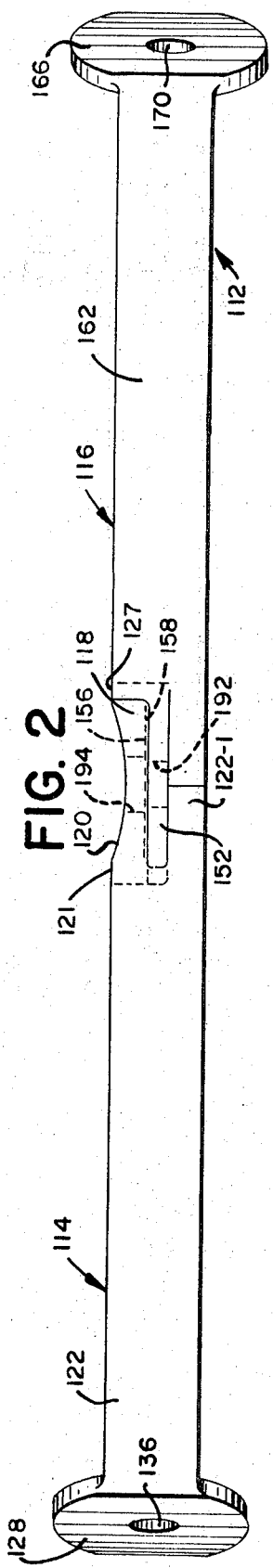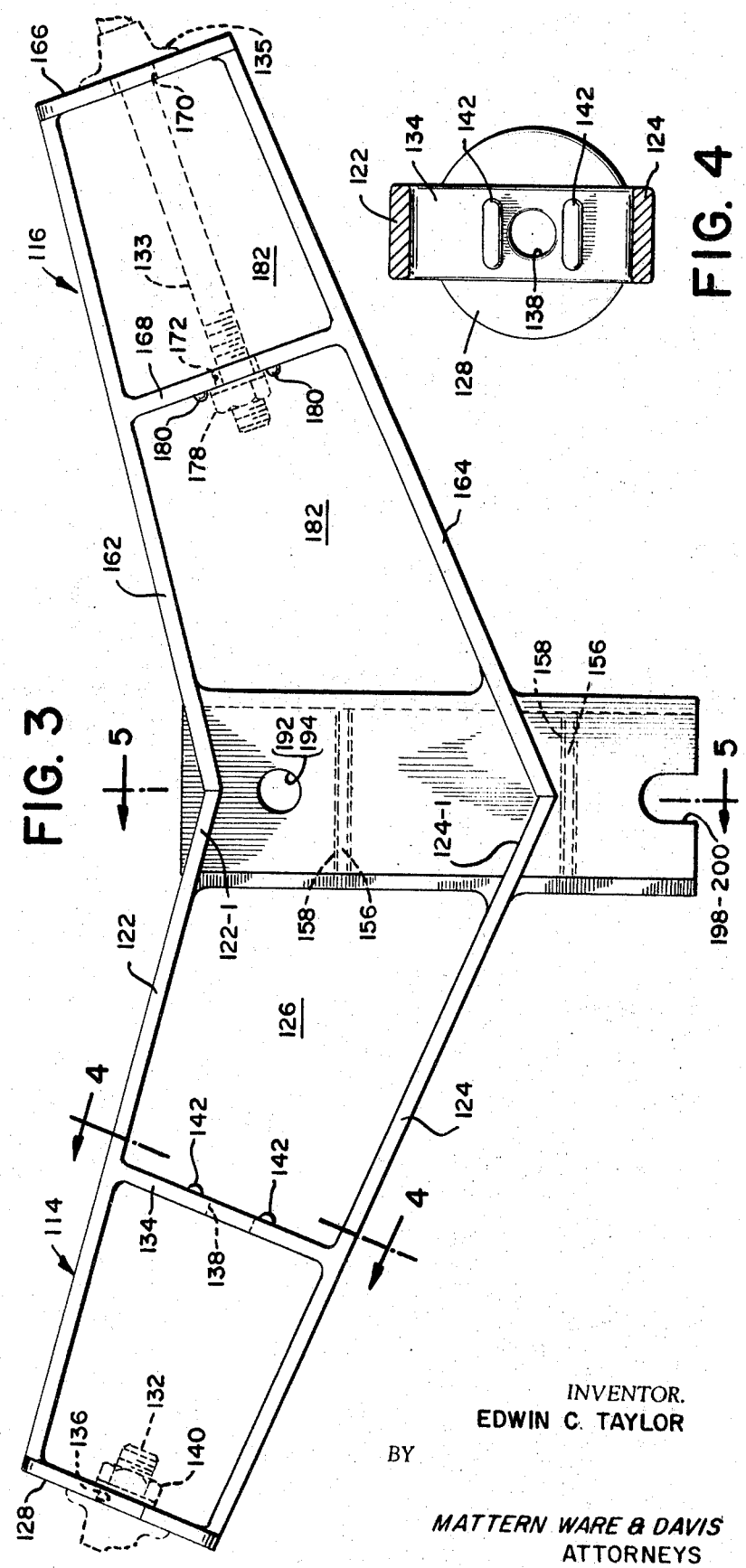

UTILITY WIRE SUPPORTING BRACKET

FIELD OF THE INVENTION

This invention relates generally to utility pole hardware, particularly brackets of the type for supporting power lines upon utility poles.

PRIOR ART

Power lines have been mounted upon utility poles for many years. Recently, however, there have been demands for changes in the way that such lines are strung. As part of the current outcry against environmental pollution, criticism has been leveled against man-made structures which do not blend pleasingly with the natural landscape, particularly in suburban and rural areas. There have even been demands that, in certain areas of natural beauty of residential tranquility, power and telephone lines should be buried below ground, at great cost to the utilities. In other areas aboveground utility poles are considered tolerable, but more esthetic structures would be preferred. This latter trend received press recognition in a Wall Street Journal article published on Feb. 1, 1968, which dealt with the need for better-looking electrical power transmission facilities.

Apart from esthetic and environmental considerations, there have been other drawbacks to the utility pole hardware of the prior art, drawbacks which relate to the design and usage of the hardware. In particular, reference is made to utility pole brackets which are capable of keeping the conductors sufficiently far apart to meet electrical requirements. In the past, such "armless" brackets intended to obviate the need for heavy timber crossarms have been constructed as one-piece, integral units which presented difficulties in molding, in storage prior to use, in handling, and in mounting upon the utility poles. In addition, prior art hardware of this kind has not been notably versatile in accepting different types of insulator attachment bolts. This required the storage and the onsite availability of a large inventory of brackets and/or insulators and bolts.

THE INVENTION

The invention provides a utility wire supporting bracket which comprises two separate components. When disassembled, these components occupy less storage space and are easier to handle and install on the utility pole. In addition, the component parts of the bracket are easier to make because they are molded individually. The components have special features which make them particularly easy to assemble, and the same mounting bolts serve to assemble the components and mount them in place upon the pole, the bracket assembly is capable of accepting a variety of different insulator mounting posts and pins, which further simplifies the problem of equipment storage and transportation to the utility pole sites. Finally, the bracket assembly of this invention is considered a distinct esthetic improvement, consistent with the demands of the conservationists.

BRIEF DESCRIPTION OF THE DRAWING

FIG. 1 is a perspective view of a conventional utility pole and a bracket assembly in accordance with this invention.

FIG. 2 is a top plan view of the same bracket assembly.

FIG. 3 is a front elevational view of the same bracket assembly.

FIG. 4 is a sectional view of one arm of the bracket assembly, taken along the line 4-4 of FIG. 3, looking in the direction of the arrows.

FIG. 5 is a sectional view through the center of the bracket assembly taken along the lines 5-5 of FIG. 3, looking in the direction of the arrows; and FIG. 6 is an enlarged fragmentary top plan view, with parts sectioned for clarity of illustration, showing how the two bracket components fit together.

The same reference characters refer components the same elements throughout the several views of the drawings.

DETAILED DESCRIPTION OF THE PREFERRED EMBODIMENTS

In the view of FIG. 1 there is seen a conventional utility pole 100 having a bracket assembly 112 thereon in accordance with this invention, to support utility wires for electrical power purposes. When the bracket is used for electrical power transmission, there is a requirement for minimum spacings to be maintained between any two of the phase wires. Therefore, the bracket assembly 112 must have a certain minimum "wingspread" in order to hold the phase wires the required distance from each other. But if the assembly 112 were molded as a single part, the production of such a device would be a difficult task for the foundry and there would also be problems in storing such large, heavy brackets prior to usage and in trucking them out to the utility pole sites, as well as in carrying them up to the top of the pole and installing them in place thereon.

Accordingly, the bracket assembly 112 comprises two distinct elements which may be described as a left arm component 114 and a right arm component 166. These components are separately molded and thus are easier to manufacture, store, transport, handle and install. At the same time they are designed for extra ease of assembly so that the necessity for coupling them to form the bracket assembly 112 does not present any added difficulties.

The left arm component 114 includes a base member 118 which is formed with a curved rear surface 120 adapted to abut against the rounded surface of a round utility pole 100. Surface 120 terminates along its left outer edge in a flat vertical outer rear surface 121 cooperating with a similar opposite vertical rear surface 127 formed on right arm component 116 forming a continuation of the right edge of surface 120 and lying in a common vertical plane with surface 121 to contact the surface of a pole of square or polygonal cross section. Extending outwardly from the base member 118 are a pair of struts 122 and 124 which defined two large spaces 126 between them, so as to form a somewhat airy looking structure which contributes to the esthetic appearance of the bracket assembly 112. At the outer ends of the struts 122 and 124 there is an insulator base pad 128 which acts as a seat for the electrical insulator and its mounting bolt or post 132. An intermediate webbing 134 extends between the struts 122 and 124, and would cooperate with the base pad 128 to mount either a post-type insulator or a pin-type insulator of the long shank pin variety, such as pin 133 illustrated by way of example in FIG. 3 as mounted on the right arm component 116.

The versatility of the present bracket assembly, with respect to the variety of insulators and pins which can be used, may now be appreciated. The insulator base pad 128 is formed with an opening 136 to admit the insulator mounting post 132. Since the mounting post is of the short shank, or stud variety, the nut 140 which is threaded on the bolt engages directly against the base pad 128, which acts as the sole support for the insulator and its mounting bolt 132. On the other hand, when the long shank pin 133 is employed, it extends not only through the opening 136 formed in the outer base pad 128 but also through a similar opening 138 which is formed in the inner webbing 134 and which is axially aligned with the opening 136. In that case, as shown at the right hand side of FIG. 3, the nut 178 is threaded onto the pin 133 and tightened against the inner webbing 168 by turning the pin 133. A pair of parallel ridges 180 are formed on opposite sides of the opening 172 on the nut-engaging face of the inner webbing 168 to lock the nut 178 in place and prevent its rotation as the mounting pin 133 is turned and threaded thereto by engaging a wrench with the wrench flats 135 formed on the pin 133 beyond pad 166.

The other component 116 of the bracket assembly 112 comprises a mating member 152 which is designed to permit the two assemblies 114 and 116 to be interlocked. The mating member 152 slides to the left, as indicated by arrow 154 in FIG. 6, to result in an overlying relationship with the base member 118 of unit 114, as best illustrated in FIGS. 1, 2 and 5. As the base member 118 and mating member 152 slide together, a pair of ridges 156 formed on the rear surface of the mating member 152 move into engaging relationship with respective correspondingly positioned grooves 158 on the front surface of the base member 118. The interengagement between ridges 156 and grooves 158 serves to lock the base member 118 and mating member 152, and hence the two assemblies 114 and 116 together in a fixed relationship so that they cannot slide vertically relative to each other.

For further locking of the two components 114 and 116 together, the struts 122 and 124 of the left component 114 are formed with extensions 122.1 and 124.1 respectively which extend partially across the front surface of the base member 118 in spaced relationship therefrom so as to form a recess designated 160 in FIG. 6 for receiving the mating member 152 of component 116. It will be appreciated, particularly from the view of FIGS. 2 and 5, that when the mating member 152 is received within recess 160 it is locked against forward or backward horizontal movement relative to the component 114.

Component 116 also includes upper and lower struts 162 and 164 respectively which extend outwardly from the mating member 152 to support insulator base pad 166 and web 168 having respective bolt openings 170 and 172 which receive the mounting bolt 133 of an insulator. The nut 178 which secures the bolt 133 is locked in place by a pair of parallel ridges 180 on the underside of the inner webbing 168, for the same purpose as the ridges 142 on the other side of the bracket assembly 112. Of course the insulator base pad 166 can also accept short shank or stud insulator mounting bolts. Note that the upper and lower arms 162 and 164 again are separated from each other to define intermediate spaces 182 which give the bracket an airy and more esthetic look than such fixtures had previously.

In mounting the entire assembly 112 on the utility pole 100, an upper bolt 190 is inserted through aligned openings 192 and 194 formed in the mating member 152 and base member 118 respectively, while a second mounting bolt 196 passes through slots 198 and 200 which are also formed in the mating member 152 and base member 118 respectively at the lower edges thereof. These bolts pass through the utility pole and cooperate with conventional fastening elements to secure the bracket assembly to the pole, while also serving to hold the bracket assembly 112 together.

Summarizing the advantages of the invention, it will now be appreciated that the bracket assembly is easily molded by casting its two components separately. In addition these components can be stored in disassembled relationship, so as to avoid the difficulties inherent in the storage of a single part having the overall "wingspread" of the entire bracket assembly. The device is also easily carried up to the top of the utility pole in separate pieces and then easily assembled and mounted upon the utility pole in a single convenient operation. Finally, the presence of the outer and the intermediate webs makes it possible to use a variety of different size insulator mounting bolts.

Since the foregoing description and drawings are merely illustrative, the scope of the invention has been broadly stated, and this should be liberally interpreted to obtain the benefit of all equivalents to which the invention is fairly entitled.

I claim:

1. A utility wire supporting bracket comprising two separate components adapted to be joined to form a complete assembly;
   a first one of said components comprising a base member positioned at the rear of said bracket whereby to abut against a utility pole;
   a second one of said components comprising a mating member adapted to confront and overlie the front surface of said base member;
   means on said base member forming a recess to receive said mating member for interlocking of said components;
   aligned openings extending through said members to receive mounting bolts for attachment to a utility pole; and
   a pair of wire-supporting means extending from said respective members in opposite directions.

2. A bracket as in claim 1 further comprising; interlocking means on the confronting surfaces of said members.

3. A bracket as in claim 1 wherein said wire supporting means comprise:
   respective upper struts extending from the upper portions of said respective members;
   respective lower struts extending from lower portions of said respective members; and
   respective insulator base pads connecting the ends of each pair of upper and lower struts, and formed with respective openings to accommodate mounting bolts for utility wire-supporting devices.

4. A bracket as in claim 3 further comprising; respective intermediate webbings connecting said upper and lower struts of each component.

5. A bracket as in claim 4 wherein; said intermediate webbings are formed with respective mounting bolt holes aligned with the respective openings of said insulator base pads whereby to accommodate long shank insulator mounting bolts.

6. A bracket as in claim 3 wherein:
   both of said upper struts are formed with extensions overlying the front surfaces of their respective members, and extensions abutting each other; and
   both of said lower struts are formed with extensions overlying their respective members and also abutting each other.

7. A bracket as in claim 3 wherein; said recess is formed between the front surface of said base member and extensions of said upper and lower struts thereof extending over said front surface and spaced forwardly therefrom a sufficient distance to accommodate the thickness of said mating member.

8. A bracket as in claim 6 wherein; said strut extensions of said base member overlie, and are spaced forwardly from said front surface thereof a sufficient distance to form therebetween said mating member receiving recess.

9. A bracket as in components 1 wherein:
   said base member has a transversely concave pole engaging surface at its pole engaging side,
   a vertical flat pole contacting surface along the edge of the concave surface adjacent to the wire supporting means extending from the base member, and
   wherein the mating member has a vertical flat pole contacting surface adjacent to the wire supporting means extending from the mating member.

10. A utility wire supporting bracket comprising:
    a base adapted to abut against a utility pole and formed with openings to accommodate mountings bolts for attachment to said pole;
    a pair of wire and insulator supporting arms extending in opposite directions from said base, each of said arms including an upper strut extending from an upper portion of said base,
    a lower strut extending from a lower portion of said base, and
    an insulator supporting base pad integral with and transversely connecting the ends of said upper and lower struts, and formed with an opening having its axis parallel to the longitudinal axis of the respective supporting arm to accommodate a mounting bolt for a utility wire-supporting device.

11. A bracket as in claim 10 wherein; each arm further comprises a webbing connecting said upper and lower struts intermediate said ends thereof and said base.

12. A bracket as in claim 11 wherein; said webbings have respective mounting bolt openings aligned with the openings of their associated insulator base pads to accommodate long shank bolts.

UNITED STATES PATENT OFFICE
CERTIFICATE OF CORRECTION

Patent No. 3,568,968        Dated   March 9, 1971

Inventor(s)   Edwin C. Taylor

It is certified that error appears in the above-identified patent and that said Letters Patent are hereby corrected as shown below:

Column 2, line 1, change "components" to -- to --

Line 24, change "166" to -- 116 --

Line 41, change "defined" to -- define --

Column 4, line 45, change "components" to -- claim --

Line 56, change "mountings" to -- mounting --.

Signed and sealed this 29th day of June 1971.

(SEAL)
Attest:

EDWARD M. FLETCHER, JR.
Attesting Officer

WILLIAM E. SCHUYLER
Commissioner of Pat